United States Patent [19]

Carman

[11] 4,123,229

[45] Oct. 31, 1978

[54] METHOD AND APPARATUS FOR MAKING VITREOUS SILICA

[75] Inventor: Justice N. Carman, Tarzana, Calif.

[73] Assignee: John S. Pennish, Los Angeles, Calif.; a part interest

[21] Appl. No.: 803,649

[22] Filed: Jun. 6, 1977

Related U.S. Application Data

[62] Division of Ser. No. 684,108, May 7, 1976, Pat. No. 4,054,641.

[51] Int. Cl.$^2$ .................. B01J 10/00; C01B 33/12
[52] U.S. Cl. .................................. 422/199; 65/32; 65/134; 423/335; 422/202
[58] Field of Search ............. 23/284, 277 R; 423/335, 423/337; 65/32, 134

[56] References Cited

U.S. PATENT DOCUMENTS

| | | | |
|---|---|---|---|
| 2,893,850 | 7/1959 | Bichowsky | 23/284 |
| 3,051,555 | 8/1962 | Rummel | 23/277 R X |
| 3,275,408 | 9/1966 | Winterburn | 423/337 |
| 3,423,324 | 1/1969 | Best et al. | 23/284 X |
| 3,717,439 | 2/1973 | Sakai | 23/284 X |
| 3,801,294 | 4/1974 | Schultz et al. | 423/337 X |
| 4,038,370 | 7/1977 | Tokimoto et al. | 423/335 X |
| 4,040,795 | 8/1977 | Jung | 23/277 R X |

Primary Examiner—Morris O. Wolk
Assistant Examiner—Roger F. Phillips
Attorney, Agent, or Firm—Harris, Kern, Wallen & Tinsley

[57] ABSTRACT

Method and apparatus for making vitreous silica of high purity including producing a melt of liquid silicon in a first chamber, mixing the liquid silicon with carbon dioxide in an upper zone of a second chamber to produce silicon monoxide, mixing the silicon monoxide with oxygen in a lower zone of the second chamber producing silicon dioxide in gaseous form, condensing the silicon dioxide on the wall of the second chamber, and withdrawing the resultant tube of vitreous silica from the lower end of the second chamber. The apparatus is lined with silica to prevent introduction of impurities. The liquid silicon is produced by mixing hydrogen and trichlorosilane.

11 Claims, 2 Drawing Figures

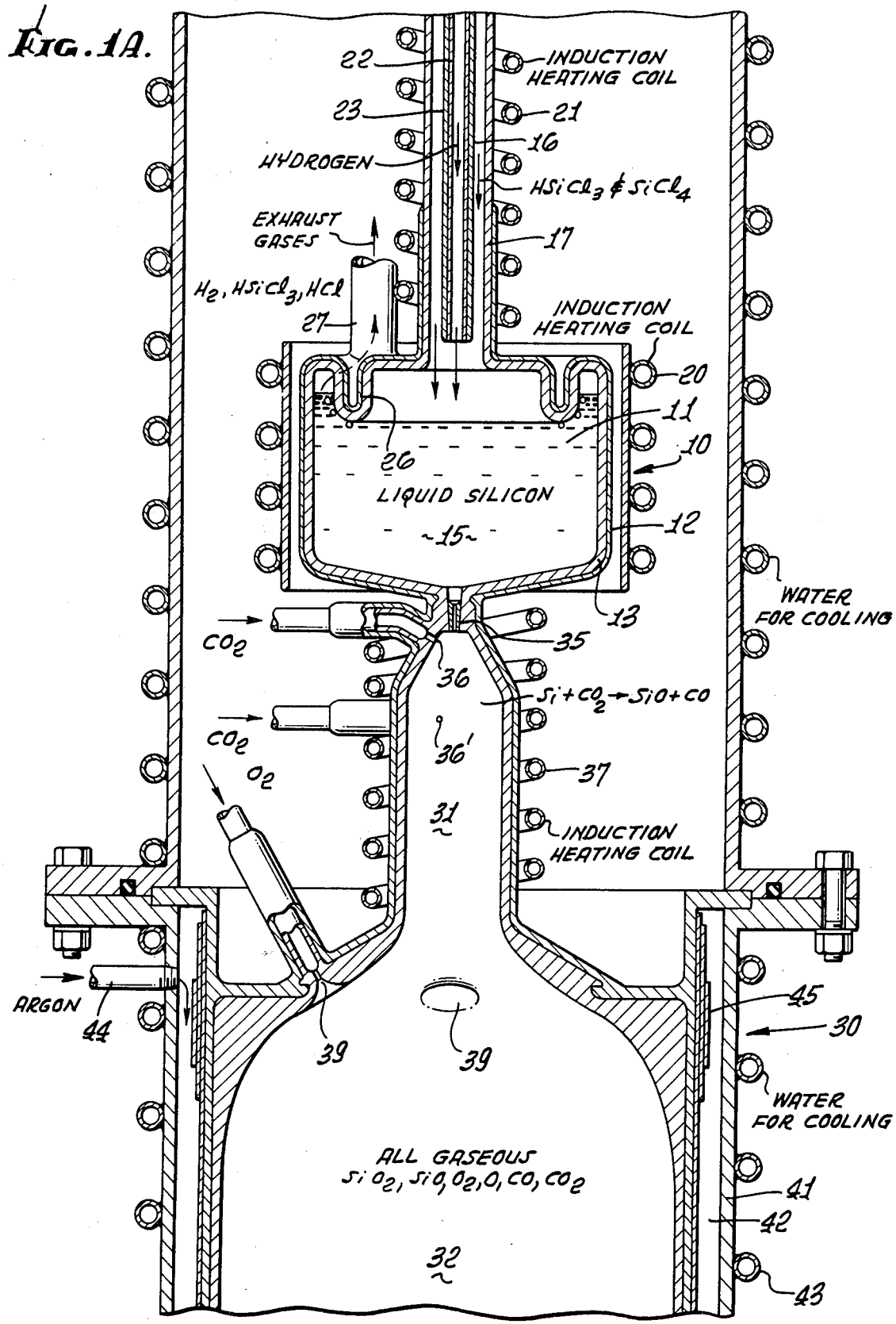

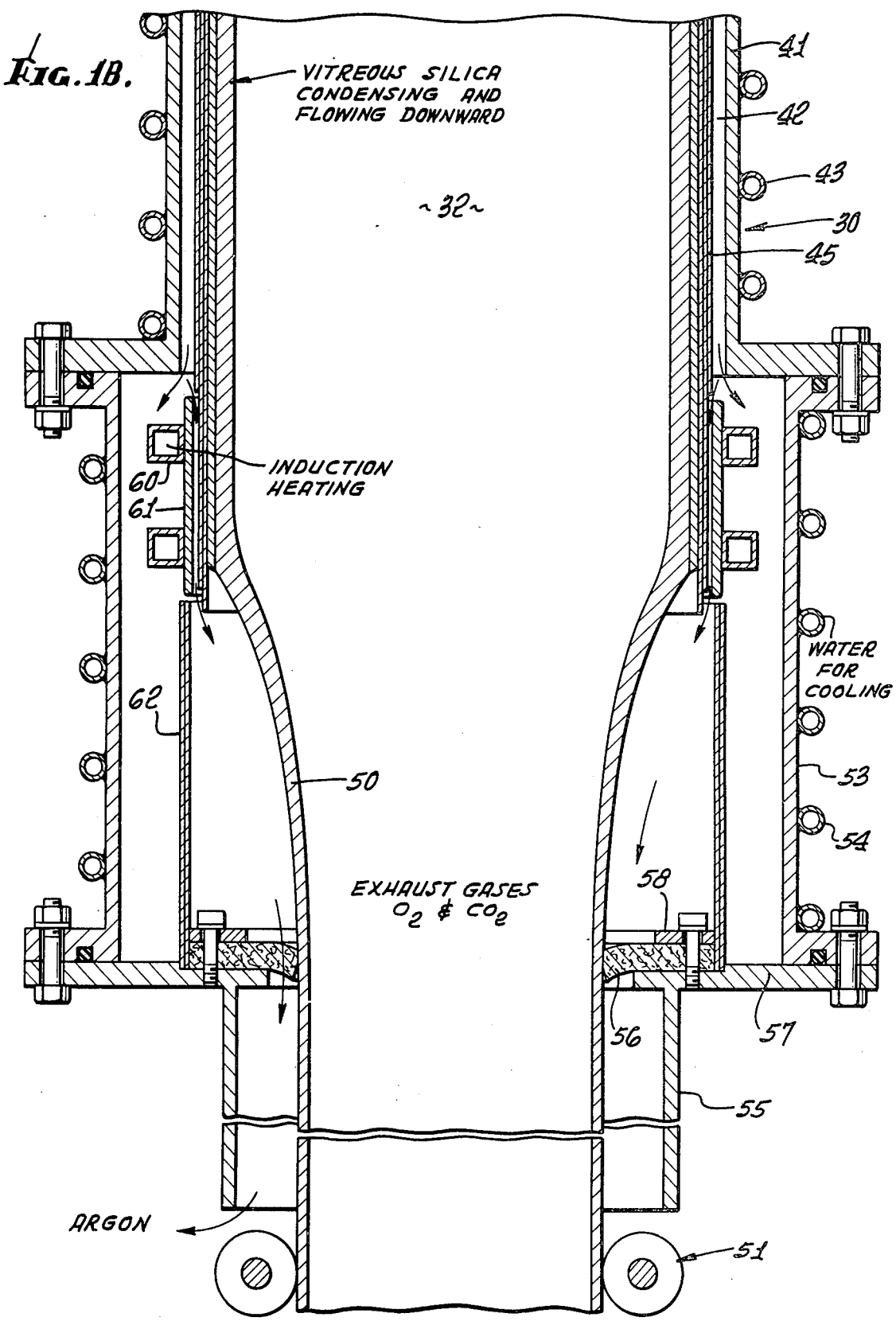

METHOD AND APPARATUS FOR MAKING VITREOUS SILICA

This is a division of application Ser. No. 684,108, filed 5-7-76 and now U.S. Pat. No. 4,054,641.

BACKGROUND OF THE INVENTION

This invention relates to method and apparatus for making vitreous silica. Vitreous silica is a non-crystalline form of silicon dioxide, that is, not a quartz crystal, though sometimes referred to as glassy quartz.

The subject of vitreous silica is discussed extensively in the Encyclopedia of Chemical Technology, 2nd Ed. Vol. 18 by Kirk-Othmer at pages 73–105. Various types of silica glasses are discussed in the article Properties and Structure of Vitreous Silica by R. Bruckner in Journal of Non-Crystalline Solids 5(1970) 123–175. This article identifies four types of silica glasses by the manner in which they are produced and also refers to a fifth type produced in a plasma flame.

The vitreous silica produced by the prior art processes and apparatus suffer from various disadvantages, primarily that of purity. Impurities in the range of 25 to 100 parts per million are present in the prior art products. It is an object of the present invention to provide a method and apparatus for producing bubble free vitreous silica the purity of which is limited only by that of the input materials.

SUMMARY OF THE INVENTION

The present invention provides method and apparatus for producing vitreous silica the purity of which is limited only by the purity of the starting material. Materials with impurity levels less than five parts per billion are presently available.

A fine stream of liquid silicon is mixed with jets of carbon dioxide and oxygen in a vertically disposed elongate reaction chamber. The resultant exothermic reaction generates a flame in which all material is gaseous. The principal gas species are $O_2$, $O$, $SiO$, $SiO_2$, $CO$ and $CO_2$.

The chamber wall constitutes a heat sink providing a surface for the condensation of silica. By the time the gases reach the lower end of the reaction chamber, the silicon monoxide has combined with the abundant supply of oxygen and condensed on the wall. The fluid silica runs down the chamber wall forming a tube at the lower open end. The exhaust gas is primarily oxygen and carbon dioxide.

A mechanism may be provided to pull the tube at a constant rate from a position below the reaction chamber exit. The tube diameter can be varied by controlling the rate of the puller. Desirably, a baffle is positioned about the chamber extending from the top to well beyond the exit where the silica tube has cooled below the anneal temperature, 1400° K. A cutoff mechanism may be provided to separate and remove the annealed tubing at appropriate intervals.

A source for the liquid silicon may be mounted at the upper end of the reaction chamber, with the silicon preferably produced by a reaction of hydrogen and trichlorosilane.

BRIEF DESCRIPTION OF THE DRAWINGS

FIG. 1A is a sectional view of the upper portion of an apparatus for making vitreous silica and incorporating the presently preferred embodiment of the invention; and FIG. 1B is a similar view of the lower portion of the apparatus.

DESCRIPTION OF THE PREFERRED EMBODIMENTS

The apparatus includes a source 10 of liquid silicon with the preferred form shown in FIG. 1A. A container 11 has an outer wall 12 of a refractory metal such as tungsten or molybdenum and an inner lining 13 of fused quartz. The container may be made by fabricating fused quartz in the desired configuration and then plasma spraying the metal outer layer thereon. A pool of liquid silicon 15 is produced by mixing a stream of hydrogen in line 16 and a stream of trichlorosilane in line 17. The silicon is heated above its melting point 1685° K., as by means of an induction heating coil 20 positioned about the chamber 11. If desired, silicon tetrachloride can be used in combination with or in place of the trichlorosilane. Other hydrogenated silanes may be used, but most are more expensive and/or more difficult to handle. The two named are the only ones presently known to be available in commercial quantities.

The incoming gases in the tubes 16, 17 are heated by another induction heating coil 21, with the tube 16 preferably having a tungsten inner lining 22 and a fused quartz outer layer 23. The excess gases from the reaction which forms the liquid silicon bubble outward around the baffle 26 and are removed as exhaust gases through outlet line 27.

The vitreous silica is produced in a reaction chamber 30 having an upper zone 31 and a lower zone 32. The chamber 30 may be produced in the same manner as the chamber 11, as by forming the chamber of fuses quartz and then spraying on a metal shell.

An orifice, preferably in an insert 35 at the junction between the chamber 11 and the zone 31, provides continuous flow of a fine stream of liquid silicon into the zone 31. Typically the insert is made of a high temperature resistant material such as silicon carbide.

Carbon dioxide gas is introduced into the zone 31 at orifices 36 and 36'. The upper orifice 36 directs a jet of gas into the stream of liquid silicon atomizing the liquid. The lower orifice 36 directs a jet of gas generally tangential producing a cyclonic motion of the gas mixture. This motion moves the heavier solid particles outward to the wall of the chamber where they adhere and volatize, thus preventing particles from moving downward into the zone 32. There is an oxidation reaction between the silicon and the carbon dioxide producing silicon monoxide and carbon monoxide. This is an endothermic reaction and heat for aiding the reaction may be provided by an induction heating coil 37. While a simple cylindrical shape is shown for the chamber at the zone 31, various shapes may be utilized to provide various gas flow patterns during the mixing and reaction.

A stream of oxygen is introduced into the lower zone 32 through one or more nozzles 39 for mixing with the material as it moves downward from the zone 31 into the zone 32. The reaction of oxygen with silicon monoxide produces high heat in the zone 32 causing all of the material to be in the gaseous state.

While stoichimetric proportions theoretically are possible, it is preferred to have an excess of carbon dioxide and of oxygen in the upper and lower zones, respectively. The mixing requirements for the $CO_2$ jets readily produces a surplus of $CO_2$. A control on the reaction can be achieved by adding some CO or $O_2$ to the $CO_2$. An excess of $O_2$ in the lower zone 32 assures reaction of all of the silicon. The temperature in the zone can be controlled to some degree by varying the volume of oxygen introduced during the reaction.

The chamber 30 may be supported within a tube 41 providing an annular space 42 between the chamber and tube. Coils 43 may be carried on the tube 41 for circulating cooling water. A stream of inert gas, such as argon, may be introduced into the space 42 through a line 44. A heat shield may be carried on the outer surface of the chamber 30, and typically comprises layers 45 of tungsten or molybdenum of various lengths for controlling heat flow. The inert gas serves to protect the heat shield 45 from oxidizing. The inert gas may also be used for temperature control. Inserts similar to the insert 35 may be used at the gas orifices 36, 36', 39 if desired.

The gaseous silicon dioxide condenses on the wall of the chamber and flows downward along the wall forming a tube 50. As this tube moves downward through the chamber, its temperature is controlled so that it slowly cools to a temperature below its annealing temperature. The tubing may be drawn from the bottom of the chamber by a conventional tubing drawing mechanism indicated generally at 51. The tubing is then cut into appropriate lengths as desired.

Various configurations may be utilized for controlling the temperature at the lower end of the chamber 30, and the presently preferred embodiment is shown in FIG. 1B. A sleeve 53 is attached to the sleeve 41 and carries tubing 54 for cooling water flow. Another sleeve 55 is affixed to the sleeve 53. The cooling gas which flows down the passage 42 continues downward through the sleeves 53 and 55. A graphite felt wiper 56 may be mounted on a flange 57 by a ring 58. The wiper has a central opening of a size for passage of the tube 50. The cooling gas will flow through the felt wiper. Another induction heating coil 60 may be carried on a sleeve 61 adjacent the lower end of the chamber. Heat shields 62 may be positioned below the end of the chamber. The sleeve 55 may be in the order of 10 to 20 feet long to provide adequate cooling time, and a plurality of additional wipers 56 may be positioned along the sleeve 55. The wipers also serve to prevent reverse flow or circulation of the inert gas.

In operation, a fine stream of liquid silicon is injected into the upper zone 31 and is immediately dispersed by jets of preheated carbon dioxide. This reaction yields silicon monoxide and carbon monoxide. In the zone 32 where the jets of oxygen enter, exothermic reactions create an intense flame in which everything becomes gaseous. As the gases approach the cooler chamber wall they recombine and condense producing a layer of flowing silica along the chamber wall. Carbon dioxide and surplus oxygen exhaust down the tube as the residue.

Throughout the apparatus, the product, vitreous silica, is used to contain the reactions wherein additional vitreous silica is formed. Thus the only foreign material on the inside of the reaction chamber are oxygen and oxides of carbon which have only limited solubility in silica and are harmless in the final product. The outside of the tube 50 as it moves from the chamber is exposed only to the inert argon atmosphere until it has cooled below the anneal temperature.

The structural materials for the chamber preferably are tungsten and/or molybdenum. These metals are strong at high temperature, have high thermal conductivity, and do not react with silica under the conditions of use herein. In the reaction chamber, silica builds up to a substantial thickness covering the entire inner surface of the chamber. The low thermal conductivity of silica tends to increase the thickness of the silica layer. The maximum of the thermal gradient through the silica layer is several hundred degrees, but decreases at both the upper and lower ends of the chamber.

To fully appreciate the character of the silica layer in the chamber, one should also consider that its viscosity changes only gradually with temperatures. At 2000° K. its viscosity is almost $10^6$ poise, whereas at 3000° K. it is still five hundred poise. The tungsten-silica interface ranges from 2000° K. to 2300° K. at which temperature the flow is gradual at most. The inner surface of the silica reaches between 2700° K. and 3000° K. at which it flows readily.

The thickness of the silica layer reaches a state of dynamic equilibrium shortly after any adjustment of material input is made. From one end of the chamber to the other the silica thickness varies; however, at any given level its thickness tends to be uniform. A dynamic equilibrium controls the thickness. The first factor is surface temperature; a cooler surface increases condensation which in turn increases wall thickness. This brings in the second and compensating factor; increases in wall thickness tend to increase surface temperature, thus lowering viscosity and increasing material flow until equilibrium is reestablished. Control of this stabilized condition may be built into the chamber design and the arrangement of heat shields which control thermal dissipation. Ordinarily no adjustment is necessary; however, adjustment of the inert gas flow may be used for obtaining small changes in temperature for fine tuning of the operation.

The temperature at the zone 31 desirably is controlled to insure production of silica monoxide with the limited amount of oxygen provided by the carbon dioxide stream. Heat input for accurate temperature maintanance is provided by the induction heating coil 37. The reaction in the zone 32 is highly exothermic so that no additional heat sources are required to insure that all of the silica monoxide is reacted with the oxygen.

The chamber 11 is heated to maintain the silicon in a molten state, typically in the range of 1700° to 1900° K. It is desirable that the reactant gases be preheated prior to entering the chamber 11 for enhancing the reaction and this may be accomplished by the induction heating coil 21. Other methods of gas preheating may be utilized, but it is preferred to have the separate gas streams enter the chamber directly over the liquid silicon. The incoming gas streams provide a pressure in the chamber 11 which aids in ejecting the stream of liquid silicon into the zone 31.

Other arrangement for providing the liquid silicon may be used. For example, solid silicon such as chunks, granules or rods, may be melted in a container for delivery to the zone 31. A gas trap entry way would be needed for continuous operation. In another alternative arrangement, a closed loop halide system could bring the gaseous silicon compound to the liquid silicon containing vessel, where high temperature fractionation would add to the liquid silicon supply while returning the remaining gas to the silicon source for re-use.

While the present invention is directed to method and apparatus for making pure silica, various modifiers may be incorporated in the finished product if desired. These modifiers are given below by way of example and are not intended to limit the range of modifiers.

The sag point of fused silica may be raised about 100° K. by adding in the order of 0.20 to 0.25% alumina to the silica. This may be accomplished by including an aluminum halogen, such as aluminum chloride, in the trichlorosilane gas input.

The inclusion of about 10% titania reduces the coefficient of thermal expansion of silica from $55 \times 10^{-8}$ to approximately zero. Titania also increases the index of refraction of silica. Titania may be added in the form of titanium tetrachloride.

The incorporation of about $\frac{1}{4}$ to $\frac{1}{2}$% of neodymium oxide produces a silica suitable for use as a laser glass. The neodymium may be introduced as neodymium chloride. All of these metallic halogens become gaseous when heated and are easily handled in the apparatus disclosed herein.

Silica has a solubility in molten silicon in the order of 1–10 parts per million. Hence when a silica lining is used for a chamber containing molten silicon, such as the chamber 11, the molten silicon tends to erode the wall over a period of time. This erosion effect may be reduced or eliminated by maintaining the molten silicon saturated with oxygen.

In the embodiment disclosed herein, this may be accomplished by adding a small amount of water vapor to the hydrogen streams. It is preferred to provide a silica lining inside the tungsten 22 of tube 16 to protect the metal from the oxidizing effect of the water vapor.

In an alternative mode, a small amount of an oxysilane, in the order of 1–10 ppm, may be included with the hydrogenated silane to provide the oxygen for the silicon.

The optimum amount of the oxygen source material is best determined by experiment with the specific apparatus being used.

I claim:

1. In an apparatus for making vitreous silica, the combination of:
a first chamber for liquid silicon;
means for heating said first chamber;
a second elongate chamber disposed in a generally vertical position;
means for directing a stream of liquid from said first chamber into an upper section of said second chamber;
means for heating said upper section of said second chamber;
means for directing a stream of carbon dioxide into said upper section for mixing with said stream of liquid;
means for directing a stream of oxygen into a lower section of said second chamber below said upper section for mixing with the material moving down from said upper section; and
means for cooling the wall of said second chamber at said lower section for condensing silicon dioxide on the inner surface thereof.

2. The apparatus as defined in claim 1 wherein said second chamber has an outer metal shell and an inner lining of silicon dioxide.

3. The apparatus as defined in claim 2 wherein said first chamber has an outer metal shell and an inner lining of silicon dioxide.

4. The apparatus as defined in claim 1 including means for heating said second chamber at said upper section and means for cooling said second chamber at said lower section.

5. The apparatus as defined in claim 1 including:
tube means defining an annular flow path about said second chamber at said lower section; and
means for directing a stream of gas downward through said annular flow path.

6. The apparatus as defined in claim 5 including a porous wiper positioned adjacent the lower end of said second chamber with a central opening in said wiper for the passage of a tube of silicon dioxide downward from said second chamber.

7. The apparatus as defined in claim 5 including means for heating said second chamber at the lower end thereof.

8. The apparatus as defined in claim 1 including:
means for directing streams of hydrogen and at least one gaseous hydrogenated silane into said first chamber; and
means for removing exhaust gases from said first chamber.

9. The apparatus as defined in claim 8 including a divider depending downward from the upper surface of said first chamber separating the incoming streams and the exhaust gases.

10. The apparatus as defined in claim 8 including means for directing a source of oxygen into said first chamber with one of said streams of hydrogen and hydrogenated silane.

11. The apparatus as defined in claim 1 wherein said means for directing a stream of carbon dioxide into said upper section of said second chamber includes:
first means for directing a first upper stream of carbon dioxide toward said stream of liquid; and
second means for directing a second lower stream of carbon dioxide generally tangential in said upper section.

* * * * *